United States Patent [19]
Gnann et al.

[11] Patent Number: 5,538,636
[45] Date of Patent: Jul. 23, 1996

[54] PROCESS FOR CHEMICALLY OXIDIZING HIGHLY CONCENTRATED WASTE WATERS

[75] Inventors: Michael Gnann, Grosshesselohe, Germany; Carl-Heinz Gregor, Mollem-Asse, Belgium; Siegfried Schelle, Puchheim, Germany

[73] Assignee: Solvay Interox GmbH, Hölriegelskreuth, Germany

[21] Appl. No.: 227,326

[22] Filed: Apr. 14, 1994

Related U.S. Application Data

[63] Continuation-in-part of PCT/EP92/02357 Oct. 13, 1992.

[30] Foreign Application Priority Data

Oct. 14, 1991 [DE] Germany ............ 41 34 003.5

[51] Int. Cl.$^6$ ............ C02F 3/00; C02F 1/72; C02F 1/461
[52] U.S. Cl. ............ 210/631; 210/711; 210/713; 210/757; 210/759; 210/722; 210/748; 205/746; 205/747; 205/751; 205/760; 205/761; 204/520; 204/542
[58] Field of Search ............ 210/712, 713, 210/710, 711, 759, 748, 722, 757, 631; 204/149

[56] References Cited

U.S. PATENT DOCUMENTS

| | | | |
|---|---|---|---|
| 4,539,119 | 9/1985 | Cann | 210/711 |
| 5,102,556 | 4/1992 | Wong | 210/711 |

FOREIGN PATENT DOCUMENTS

| | | | |
|---|---|---|---|
| 0008074 | 2/1980 | European Pat. Off. | 210/759 |
| 3840323 | 5/1990 | Germany | 210/722 |
| 2944 | 1/1978 | Japan | 210/759 |
| 47358 | 4/1979 | Japan | 210/759 |

*Primary Examiner*—Neil McCarthy
*Attorney, Agent, or Firm*—Nikaido, Marmelstein, Murray & Oram

[57] ABSTRACT

A process to purify waste waters using chemical oxidation and Fenton's reagent by the action in the acid range of hydrogen peroxide and iron(II) compounds and subsequent precipitation in the weakly acid to alkaline range of the iron(III) compounds, said process being characterized in that the sludge containing iron(III) accumulating in addition to the purified waste water is reduced electrolytically back into iron(II) compounds and in that the sludge so reduced is fed back into the process. The process of the invention allows extensive purification of highly concentrated waste waters and furthermore problems arising with the treatment and elimination of the Fenton sludge can be circumvented.

15 Claims, 1 Drawing Sheet

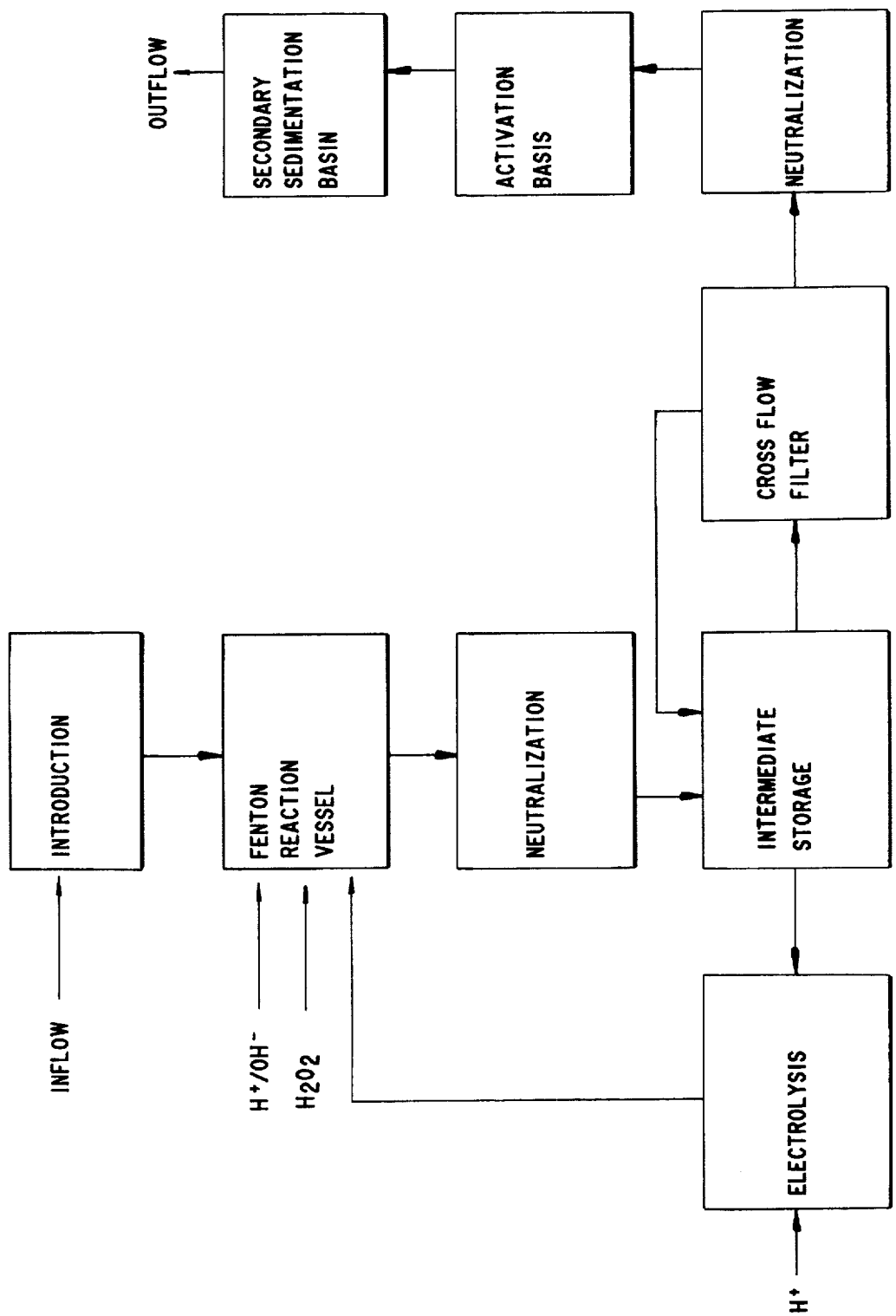

PROCESS FOR CHEMICALLY OXIDIZING HIGHLY CONCENTRATED WASTE WATERS

CROSS REFERENCE TO RELATED APPLICATION

This application is a continuation-in-part of International Application PCT/EP92/02357, filed Oct. 13, 1992, and designating the U.S.

BACKGROUND OF THE INVENTION

It is known to purify waste waters using Fenton's Reagent (illustratively, European patent document B 0 022 525; German patent document C 38 32 523; H. Schwarzer, "gfw-Wasser/Abwasser" 129, #7, 1988, pp 484–19 1; E. Gilbert, "Nom Wasser" 62, 1984, pp 307–320), By means of chemical oxidation, the values of COD (chemical oxygen demand), BOD5 (biochemical oxygen demand after 5 days), TOC (total organic carbon), TOD (total oxygen demand), AOX (halogenated hydrocarbons adsorbable on activated carbon), but also organic compounds such as phenols, formaldehyde etc. and further toxic and inhibiting inorganic compounds such as cyanides, sulfur compounds, are reacted or eliminated. The Fenton reaction takes place in the acid range with addition of hydrogen peroxide as the oxidant and with iron(II) salts as the catalyst. In the ensuing neutralization, the formed iron(III) hydroxide precipitates in brown and hardly soluble form and is separated by sedimentation (gravitation) or by mechanical separation from the treated waste water.

It is further known that this resulting solid, which is called the Fenton sludge, adsorptively bonds organic contaminants to the sludge flakes. As a result difficult problems ensue concerning its treatment and elimination.

Accordingly it is the object of the present invention to create a process solving these consequential problems in simple manner, the Fenton sludges then being reprocessable, whereby simultaneously they may be re-used. This problem is solved by the object of the present invention.

The object of the present invention is a process to purify waste waters by chemical oxidation using Fenton's reagent in the form of hydrogen peroxide and iron(II) compounds in the acid range with ensuing precipitation of the iron(III) compounds in the weakly acid to alkaline range. This process is characterized in that the sludge containing iron (III), which is obtained besides the purified water, is acidified to a pH of less than about 4, to dissolve the iron (III) and to form an iron (III) solution, which then is reduced electrochemically back into iron(II) compounds, The reduced solution is fed back into the process.

Appropriate modes of implementation of this process are disclosed herein.

It is already known from the German patent document C 38 32 523 to separate the precipitated iron sludge and to suspend it in further waste waters to be treated; the purpose is to lower the operational costs of this method and to decrease the amount of iron sludge and the entailed special waste. However, this method does not allow satisfactorily solving of the consequential problems of treating and eliminating the Fenton sludge.

SUMMARY OF THE INVENTION

Now applicant surprisingly discovered that the consequential problems arising from flocculation can be satisfactorily solved regarding treatment and elimination of the Fenton sludge, especially the inorganic contaminants adsorbed on the sludge flakes, provided that the sludge containing iron(III) accumulating besides the purified waste water is reduced back to iron(II) compounds and is fed back into the process; moreover problem-free re-use of the iron(II) catalyst is made possible thereby.

The action of the hydrogen peroxide and iron (II) compounds on the water to be treated in the reaction vessel takes place in the acid range, preferably in the pH range of 2 to 5; the reaction vessel may be a conventional Fenton vessel for such purposes.

BRIEF DESCRIPTION OF THE DRAWINGS

FIG. 1 is a block diagram for a mode of implementation of the process of the invention, wherein the iron(III) sludge is reduced electrochemically.

DESCRIPTION OF THE PREFERRED EMBODIMENTS

By means of suitable feed equipment such as a gear pump, the waste water is moved from an introduction tank into the reaction vessel (Fenton vessel). Because an iron(II) solution with a pH of less than 1 is obtained from the electrolysis stage and is fed back into the reaction vessel, sometimes alkali must be added (shown in the diagram by OH—) preferably NaOH; otherwise the pH might drop below 2. As regards strongly alkaline waste waters, it may be necessary furthermore to adjust the appropriate pH value using an acid, preferably sulfuric acid. The selection of the appropriate acids for pH adjustment in the reaction vessel and/or for electrolytic reduction (pH < 1) is made in the light of the iron salt (anion) being used and to avoid application and/or presence of chlorine compounds.

A pH value of 6 or higher is set by alkalinization, preferably by adding NaOH, in the next procedural stage of neutralization. Thereby a hydroxide slurry is formed which, following separation of the purified waste water by means of suitable separation equipment, is fed to the electrochemical or chemical reduction stage. In a preferred mode of implementation shown in FIG. 1, the sludge, separated from the treated waste water is fed in a following stage to an intermediate storage vessel, which serves as a circulation container and a sludge thickener; the circulation container at the same time receives a concentrated iron(III) hydroxide slurry from the following separation stage (Crossflow filter → circulation container), and a sludge of the same concentration as in the circulation container is then fed in smaller amounts in the form of a solution of the sludge suspension into the electrolytic equipment (designated by "electrolysis" in the diagram). The pH value is set to less than 1 before the electrolytic equipment by acidification, preferably using sulfuric acid, while the sludge is dissolved and the iron(III) is reduced to iron(II) in the electrolysis. A quantity of sludgy, treated waste water matching the incoming waste water is withdrawn from the circulation container [A] and is moved through suitable separation equipment, for instance a PE crossflow filter, from which in turn purified waste water on one hand and on the other hand concentrated sludge are withdrawn. The concentration of the concentrated sludge coming from the PE crossflow filter therefore is higher than the concentration of the sludge in the circulation container.

Instead of the crossflow filter shown in the reaction diagram of FIG. 1, the separation equipment also may be conventional and appropriate for such processes, for instance centrifuges, filters, decanting apparatus, separators and/or other conventional equipment for separating liquid and solid phases.

The electrochemical reduction of Fe(III) to Fe(II) can be carried out in an appropriate and conventional manner in relation to the conditions of reaction, for instance using an electrolysis cell. Electrolysis cells may be used wherein the cathodes and anodes are not separated from each other, or wherein the catholyte and anolyte are separated from one another by a semi-permeable membrane, a diagram or an ion-exchanger membrane. The electrolysis cell, divided by a diaphragm or ion-exchanger membrane, shall preferably be used where the process of the invention is used to treat chlorinous waste waters. In this manner the undesired chlorine generation at the anode will be avoided. Preferably the anodes will be dimensionally stable, for instance made of platinized titanium or of titanium with known coatings containing platinum metal oxides (the so-called DSA electrodes, and the cathode preferably shall be of high-grade steel, in particular of high-grade steel rib-mesh (1.24539 or 1.4571), of carbon or graphite. Preferred membranes are those made of perfluorinated plastics with sulfonic-acid groups as functional groups (for instance Nafion® made by du Pont).

In one illustrative mode of implementation of the invention, the partial electrochemical reduction is carried out in a diaphragm-less, undivided electrolysis cell made of high-grade steel (material 1.4539 or 1.4571), carbon or graphite, and with dimensionally stable anodes of platinized titanium or titanium with known coatings containing platinum metal oxides (so-called DSA electrodes). In another mode of implementation using an electrolysis cell divided into a catholyte chamber and an anolyte chamber, the iron(III) solution is fed into the catholyte chamber of the electrolysis cell and therein it is reduced in part or in whole into an iron(II) solution, the current densities being from 100 to 3,000 A/m$^2$ of the projected area of the cathode.

Appropriately the current density shall be 100 to 3,000 A/m$^2$ of electrode area.

The quantities of hydrogen peroxide metered into the reaction vessel and of iron salts supplied for chemical or electrochemical reduction are appropriately selected as a function of the COD of the water to be treated. Preferably the molar ratios Of COD/H$_2$O$_2$/Fe are in the range from 20/20/1 to 20/10/5 and in particular 20/10/1.

Preferably the waste water obtained by means of the process of the invention is subjected to subsequent biological treatment; FIG. 1 shows such a procedure wherein the waste water withdrawn from the separation equipment is supplied—where called for following neutralization—to an activation basin and thereafter to a secondary sedimentation basin.

The process of the invention is suitable for the discontinuous and especially for the continuous purification of highly concentrated waste waters.

The following illustrations elucidate the invention without thereby restricting it.

EXAMPLES

Example 1

The waste water from an introduction tank is continuously metered into a reaction vessel. Through an overflow, the strongly acidic Fe$^{2+}$ solution moves out of the electrolysis stage into the reaction vessel and a peristaltic pump meters-in the amount of hydrogen peroxide required for the Fenton reaction. The desired pH value between 2 and 5 can be set by means of a pH control (H$_2$SO$_4$, NaOH).

The Fe$^{2+}$ reacted into Fe$^{3+}$ is precipitated (by controlling the pH), as hydroxide in the neutralization container by adding soda lye, and simultaneously excess hydrogen peroxide is destroyed to form a suspension.

Thereupon the suspension flows into the circulation container (intermediate storage) and is stirred together with iron(III)-hydroxide mixture (for instance 30 g of Fe$^{+3}$ per liter) introduced as recycle from a down stream crossflow filter.

The treated waste water is separated in part from the circulation container by a side-channel pump and is fed through a PE crossflow filter. The discharge quantity of treated waste water can be controlled by an inclined-seat valve following the filter.

Iron(III) hydroxide is metered out of the circulation container by a peristaltic pump and fed into an electrolysis container wherein said iron hydroxide is dissolved by lowering the pH, and the Fe$^{3+}$ is then reduced electrolytically to Fe$^{3+}$.

The volume and concentration of the iron-hydroxide sludge in the circulation container remain constant because the quantity of the drained, "filtered-off" (treated) waste water and the quantity of the iron-hydroxide sludge metered into the electrolysis container balances the feed quantity from the neutralization container.

In order to achieve as low as possible a pH value (as a rule, pH < 1) in the electrolysis cell, the sulfuric acid which is needed in the reaction vessel in introduced through the electrolysis stage. As regards strongly acidic waste waters, soda lye may be furthermore metered into the reaction vessel. In order to nevertheless maintain an ideal pH value in the electrolysis stage, the soda lye for the reaction vessel is slightly "overdosed" as regards pH; where strongly acidic waste waters are concerned, this entails metering sulfuric acid into the electrolysis stage and soda lye into the reaction vessel.

The quantities of hydrogen peroxide metered into the reaction vessel and of Fe(III) salt into the electrolysis vessel are calculated as a function of the COD value of the water to be treated, for instance:

Introduction: COD/A$_2$O$^2$/Fe=20/10/1 (molar ratios)

Waste water: COD=8,000 mg/ltr (=500 mmole/ltr)

H$_2$O$_2$: 250 mmole/ltr

Fe$^{2+}$: 25 mmole/ltr

The following quantities and equipment were used in the above described process:

Flow of waste water 5 ltr/h

Waste-water COD concentrations 1,000–12,000 mg/ltr

COD decay (depending on waste-water) 50–90 %

Dwell times:

Reaction vessel 2 h

Alkalization 1 h

Circulation container 3 h

Produced temperatures of reaction:

Electrolysis (at 6 A) up to 45° C.

Reaction vessel up to 41° C.

The circulation container is cooled by a cooling coil to about 20° C.

Materials used and their concentrations

Soda lye (technical) 50%-weight

Sulfuric acid (technical) 70%-weight

The circulation container holds dehydrated $Fe_2(SO_4)_3$ (technical) with an Fe content of 21.5–22.5%.

The concentration is stated as $Fe^{3+}$: for instance 30 g/ltr (=537 mmole/ltr).

Electrolysis cell: made of PVC, with agitator, volume used= 1.5 ltr, fitted with temperature sensor cathode: high-grade steel rib-mesh 1.4539, 80 cm$^2$ anode: platinum-coated titanium, 10 cm$^2$ Pt electrode spacing 0.5 cm power drain= 0.024 kwh (set at 6 A=4 v)

Reaction vessel: made of PVC, with agitator, used volume= 10 ltr, with temperature sensor and pH-control (directly through $OH^-$; $H^+$ indirectly by means of electrolysis)

Alkalinization (neutralizing) container: made of PVC, with agitator, used volume=5 ltr with pH control (directly by $OH^+$)

Circulation container: made of PVC, with agitator, used volume=15 ltr, may be cooled by cooling coil PE crossflow filter: made of polyethylene, porosity=50 %, pore size=$10^{-5}$ m.

The electrolysis cell, reaction vessel, neutralization container and circulation container intermediate storage vessel were transparent for improved process monitoring.

Example 2

Highly concentrated waste water was treated in an industrial test facility by the process described in Example 1. The object of the treatment was to reduce COD, TOC and AOX, foremost however the toxicity of the waste water in order to allow final purification by biological procedures.

The data for the raw waste-water and the data obtained following the treatment according to the invention are as follows:

|  | COD mg/ltr | $n_{COD}$ % | AOX µg/lt r | $n_{AOX}$ % | TOC mg/lt r | $n_{TOC}$ % | Toxicity |
|---|---|---|---|---|---|---|---|
| raw waste water | 4200 7100 |  | 1500 |  | 1000 |  | very high |
| a la Fenton treatment | 1250 3120 | 56 70 | 60 215 | 85 96 | 500 620 | 38 59 | slight |

It was possible to show in an associated and downstream biological lab (Attisholz system) that the pre-treated industrial waste water could be final-purified, because of the low inhibition, following a brief phase of adaptation of the activated sludge, an overall efficiency for the COD and TOC decomposition of more than 90% being achieved. The AOX values did not practically change after the biological treatment. The overall process corresponds to the diagram of FIG. 1, neutralization prior to the activation basin being required only when carrying out sludge precipitation (after the Fenton reaction vessel) at pH values larger than 8.

Example 3

In this Example the reduction of Fe(III) into Fe(II) is carried out chemically using gaseous $SO_2$. For that purpose iron-hydroxide slurry is removed by a peristaltic pump from the circulation container (intermediate storage) and fed into a separate reaction container (in lieu of the electrolysis container) (see FIG. 1). The Fe(III) concentration is 30 g/Ltr (= 536 mmoles/Ltr), the pH is 8.6. By means of a diffuser grit, gaseous $SO_2$ is stoichiometrically fed at 40° C. at a rate of 3 ltr/h and while stirring into the sludge, the pH dropping to 2.6.

Upon further acidification with $H_2SO_4$ to a pH of 1.4 and after heating the solution to 80° C. and holding for a dwell time of 3 h, a reduction yield of 90% is achieved. This solution is fed back through an intermediate container into the Fenton reaction container.

We claim:

1. In a process for the purification of highly contaminated feed waste waters, containing toxic industrial waste, by:

in a reaction zone, chemically oxidizing organic compounds in said feed, with Fenton reagents, including iron (II) catalysts, and hydrogen peroxide at an acid pH to produce: a sludge comprising precipitated iron (III) compounds at a weakly acidic or weakly alkaline pH; sludge components comprising iron (III) dissolved in water, at least some of which having been reduced therein to iron (II); and purified water;

separating purified water from sludge in a circulation container zone;

feeding said water containing reduced iron (II) back into admixture with said feed; and recovering purified water;

the improvement which comprises:

separating sludge comprising iron (III) compounds from purified water;

separating sludge into a concentrated sludge and a separated iron (III) containing sludge;

recovering concentrated sludge and removing it from said process;

storing sludge containing iron (III);

feeding thickened iron hydroxide slurry into admixture with said sludge containing iron (III);

controlling the pH of said admixture to less than 1, by adding sufficient acid thereto, whereby substantially dissolving said iron (III) in said sludge;

feeding a portion of said admixture to an electrolytic reduction wherein at least some of said iron (III) in said separated sludge is reduced to iron (II) to form a reduced sludge having a pH of about 2 to 5;

recycling at least a part of said reduced sludge to said reaction zone; and feeding said purified water to a biological final purification stage.

2. The improved process as claimed in claim 1 wherein said iron hydroxide is obtained from a next/downstream separation stage.

3. The improved process as claimed in claim 1 further including controlling the quantity of feed waste water to be substantially equivalent to the sum of the quantity of concentrated sludge and recovered purified water.

4. The improved process as claimed in claim 1 wherein said electrolytic reduction is carried out in a diaphramless, undivided electrolytic cell.

5. The improved process as claimed in claim 4 wherein said electrolytic cell comprises cathode means comprising at least one member selected from the group consisting of high grade steel, carbon and graphite; and anode means comprising at least one member selected from the group consisting of platinized titanium, and titanium coated with metal oxides.

6. The improved process as claimed in claim 1 wherein said electrolytic reduction is carried out in a cell comprising a semi-permeable membrane separating anolyte and catholyte zones.

7. The improved process as claimed in claim 1 wherein said electrolytic reduction is carried out in a cell comprising an ion exchange membrane separating anolyte and catholyte zones.

8. The improved process as claimed in claim 7 wherein said membrane comprises sulfonic acid group substituted perfluorinated polymer film.

9. The improved process as claimed in claim 4 including supplying cathodic current densities of about 100 to 3,000 amperes/square meter.

10. The improved process as claimed in claim 6 including supplying cathodic current densities of about 100 to 3,000 amperes/square meter.

11. The improved process as claimed in claim 7 including supplying cathodic current densities of about 100 to 3,000 amperes/square meter.

12. The improved process as claimed in claim 1 wherein said waste water has a COD value, and further comprising controlling the molar ratios of COD, hydrogen peroxide and iron (II) to about 20/20/1 to 20/10/5.

13. The improved process as claimed in claim 1 wherein said waste water has a COD value, and further comprising controlling the molar ratios of COD, hydrogen peroxide and iron. (II) to about 20/10/1.

14. The improved process as claimed in claim 1, further comprising separating said sludge from a liquid phase by using at least one member selected from the group consisting of filter means, centrifuge means, decanter means, and separator means.

15. The improved process as claimed in claim 1 wherein said acid is sulfuric acid.

* * * * *

UNITED STATES PATENT AND TRADEMARK OFFICE
CERTIFICATE OF CORRECTION

PATENT NO. : 5,538,636
DATED : July 23, 1996
INVENTOR(S) : Gnann, et al

It is certified that error appears in the above-indentified patent and that said Letters Patent is hereby corrected as shown below:

On the title page: Item [73]

line 2, delete "Hölriegelskreuth" and insert therefor -- Höllriegelskreuth --.

Signed and Sealed this

Tenth Day of December, 1996

*Attest:*

BRUCE LEHMAN

*Attesting Officer*    *Commissioner of Patents and Trademarks*